(12) United States Patent
Bromberg et al.

(10) Patent No.: US 6,981,472 B2
(45) Date of Patent: Jan. 3, 2006

(54) HOMOGENEOUS CHARGE COMPRESSION IGNITION CONTROL UTILIZING PLASMATRON FUEL CONVERTER TECHNOLOGY

(75) Inventors: Leslie Bromberg, Sharon, MA (US); Alexander Rabinovich, Swampscott, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 11 days.

(21) Appl. No.: 10/715,933

(22) Filed: Nov. 17, 2003

(65) Prior Publication Data

US 2004/0099226 A1 May 27, 2004

Related U.S. Application Data

(60) Provisional application No. 60/427,138, filed on Nov. 18, 2002.

(51) Int. Cl.
F02B 43/10 (2006.01)

(52) U.S. Cl. .................. 123/3; 123/525; 123/27 GE
(58) Field of Classification Search .............. 123/3, 123/1, 525
See application file for complete search history.

(56) References Cited

U.S. PATENT DOCUMENTS

| | | | | |
|---|---|---|---|---|
| 3,425,399 | A | * | 2/1969 | Ward et al. ................ 123/257 |
| 5,409,784 | A | | 4/1995 | Bromberg et al. ............ 429/13 |
| 5,425,332 | A | | 6/1995 | Rabinovich et al. ........... 123/3 |
| 5,437,250 | A | | 8/1995 | Rabinovich et al. ........... 123/3 |
| 5,887,554 | A | * | 3/1999 | Cohn et al. ................... 123/3 |
| 6,230,683 | B1 | * | 5/2001 | zur Loye et al. ........... 123/435 |
| 6,322,757 | B1 | | 11/2001 | Cohn et al. ............. 422/186.04 |
| 6,550,430 | B2 | * | 4/2003 | Gray ..................... 123/27 GE |
| 6,655,325 | B1 | * | 12/2003 | Botti et al. ..................... 123/3 |
| 6,662,760 | B1 | * | 12/2003 | Stanglmaier et al. .......... 123/3 |
| 6,827,047 | B2 | * | 12/2004 | Qian et al. ..................... 123/3 |

FOREIGN PATENT DOCUMENTS

WO   WO 99/42718   8/1999

OTHER PUBLICATIONS

R. H. Stanglmaier, et al., "HCCI Operation of a Dual-Fuel Natural Gas Engine for Improved Fuel Efficiency and Ultra-Low NOx Emissions at Low to Moderate Engine Loads," *SAE Technical Paper Series* 2001-01-1897, May 2001.

(Continued)

Primary Examiner—Noah P. Kamen
Assistant Examiner—Jason Benton
(74) Attorney, Agent, or Firm—Choate, Hall & Stewart LLP

(57) ABSTRACT

A method and apparatus for operation of an internal combustion engine running under a homogeneous charge compression ignition (HCCI) mode with fuel partially reformed by an onboard fuel reformer. In one embodiment, the onboard fuel reformer is a plasmatron fuel converter. The temperature and composition of the gaseous charge into the cylinders of the engine can be adjusted by mixing the charge into the cylinder (which contains air, exhaust gas and/or unreformed fuel) with hydrogen rich gas from the onboard reformer. The fuel reformer transforms the fuel to a mixture of hydrogen, CO and other light hydrocarbons. By adjusting operation in the reformer, the composition of the reformate can be altered. In addition to thermal management of the cylinder charge, the reformate can be used as a fuel blending agent in order to adjust the octane/cetane number of the air charge and thus control the ignition timing of the overall fuel/air charge to the cylinder.

27 Claims, 6 Drawing Sheets

OTHER PUBLICATIONS

T. Noda and D. E. Foster, "A Numerical Study to Control Combustion Duration of Hydrogen-Fueled HCCI by Using Multi-Zone Chemical Kinetics Simulation," *SAE Technical Paper Series* 2001-01-0250, Mar. 2001.

S. Kimura, et al., "Ultra-Clean Combustion Technology Combining a Low-Temperature and Premixed Combustion Concept for Meeting Future Emission Standards," *SAE Technical Paper Series* 2001-01-0250, Mar. 2001.

J. Martinez-Frias, et al., "HCCI Engine Control by Thermal Management," *SAE Technical Paper Series* 2000-01-2869, Oct. 2000.

H. Suzuki, et al., "Exhaust Purification of Diesel Engines by Homogeneous Charge with Compression Ignition Part I: Experimental Investigation of Combustion and Exhaust Emission Behavior Under Pre-Mixed Homogeneous Charge Compression Ignition Method," *SAE Technical Paper Series* 970313, Feb. 1997.

D. Flowers, et al., "Sensitivity of Natural Gas HCCI Combustion to Fuel and Operating Parameters Using Detailed Kinetic Modeling," *Proceedings of the ASME Advanced Energy Systems Division*, AES-39, eds. S.M. Aceves, S. Garimella and R Peterson, pp. 465-473 (1999).

P. L. Kelly-Zion and J. E. Dec, "A Computational Study of the Effect of Fuel Type on Ignition Time in HCCI Engines," *Proceedings of the Combustion Institute*, vol. 28, Part 1, pp. 1187-1194 (2000).

L. Bromberg, A Rabinovich, N. Alexeev, and D.R. Cohn, "Plasma Reforming Of Diesel Fuel," *Plasma Science and Fusion Center Report* PSFC-JA-99-004, presented at the Mar. 1999 meeting of the American Chemical Society.

L. Bromberg, A. Rabinovich, N. Alexeev and D.R. Cohn, "Plasma Catalytic Reforming Of Natural Gas," *Plasma Science and Fusion Center Report* PSFC-JA-99-016, presented at the Mar. 1999 meeting of the American Chemical Society.

\* cited by examiner

HOMOGENEOUS CHARGE COMPRESSION IGNITION CONTROL UTILIZING PLASMATRON FUEL CONVERTER TECHNOLOGY

CROSS-REFERENCE TO RELATED APPLICATION

The present application claims priority to U.S. Provisional Application No. 60/427,138, filed Nov. 18, 2002, the teachings of which are incorporated herein by reference.

FIELD OF THE INVENTION

The present invention is directed to the field of engine operating control and more particularly to a method and apparatus for an engine operating in a homogeneous charge compression ignition (HCCI) mode and utilizing plasmatron fuel converter technology.

BACKGROUND OF THE INVENTION

It has been well established that operation of an internal combustion engine in homogeneous, lean mode results in a large decrease of NOx and particulate matter emissions. Fundamentally, the reason for the decrease in these emissions is that homogeneous, lean mode engine operation avoids either fuel rich regions that generate particulate matter emissions or stoichiometric conditions that generate high temperature and NOx emissions. One type of engine operation in a homogeneous, lean mode is homogeneous charge compression ignition (HCCI) which involves the compression of a fuel/air mixture until the mixture self ignites. (See, for example, PCT Publication WO 99/42718, the teachings of which are incorporated herein by reference.)

The control of HCCI engine operation has been explored. Successful operation has been obtained, for some operating regions, by the use of late injection into an engine cylinder, with long ignition times (longer than the times required for fuel injection and for the establishment of a relatively homogeneous charge). Some degree of control through stratification of the temperature or fuel charge has been achieved, either by the use of recycled exhaust gas (EGR), or by using a heat exchanger to preheat the incoming air using hot exhaust gases. The difficulty with this approach is that ignition timing is a strong function of the temperature of the incoming air, as sensitive as 1 crank-angle degree ignition timing per 3–4° C. difference in the air charge temperature. Precise control of the temperature is therefore required for optimum results. In addition, for transportation applications with the presence of transients, a very fast response is required, especially at conditions of high power characteristic of merging and passing. Other methods of control in HCCI involve variable valve timing (VVT) or variable compression ratio (VCR), but both methods require sophisticated engine actuators.

The self-ignition timing in HCCI operation is a strong function of the fuel octane rating. Experiments with HCCI operation using fuels with several values of RON (Research Octane Number) have discovered that fuels with lower RON (i.e., more prone to self ignition) have a rather broad operational regime, as opposed to those with a high octane value. An alternative theory suggests that it is the cetane number, not the octane number, that determines the self-ignition timing.

Additives to either promote oxidation (ozone) or to ignite the fuel (by variation of the octane rating or cetane numbers of the fuel) have also been proposed. The onboard generation of ozone requires electrical power, with control being very sensitive to the amount of ozone. A 10 ppm concentration of ozone results in a 1 degree change in the ignition timing. The variation of the fuel octane/cetane numbers requires two or more fuels on board, with the inconvenience of carrying and refueling two or more tanks. Mixtures of methane and either DME, nafta, FisherTropsch fuels, and others have been explored for octane/cetane number variation. This method of ignition control in HCCI is referred to as fuel blending. Distinct fuels, from separate containers, have been used and fuel reforming has been proposed for the onboard generation of the secondary fuel required in the fuel blending process. Ignition improvers can also be used to change the cetane number of the fuel, and therefore alter the ignition characteristics of the fuel, and could be used for ignition control of HCCI.

Options for fuel reforming technology have been considered. A reformer chemically transforms fuel from one form to another. As practiced in the field today, fuel reformers are generally of a catalytic nature. A preferred method for fuel reforming on board vehicles is partial oxidation where a given amount of air is mixed with a given amount of fuel and in which the oxygen content is substantially lower than that required for full combustion of the fuel.

Under ideal stoichiometric partial oxidation conditions, the partial oxidation reaction for reforming hydrocarbon fuel (with air) is:

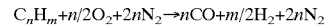

In this case there is just enough oxygen around to convert all the carbon in the fuel into CO. The partial oxidation reaction is exothermic. In the case of liquids fuels (gasoline, diesel), approximately 15% of the heating value of the fuel is released in the partial oxidation reaction. Operation requires that sufficient oxygen be present to prevent the formation of soot particles, but with low amounts of oxygen to maximize the heating value of the hydrogen rich gas. It is possible to use exhaust gas as the oxidant. In order to do so, it is preferable that the engine operates in a lean mode, so that there is some free oxygen in the engine exhaust.

Reformers can be used to generate fuels of different octane value. When operating at oxygen/carbon ratio (O/C) >1.2, the reformate has a composition similar to synthesis gas, with about 20 mol % $H_2$ and CO, and small concentration of $CO_2$, $C_2$'s, water, and the balance nitrogen. The synthesis gas can be used to increase the octane value of the fuel (since hydrogen has a very high octane value, while CO is similar to that of methane), but requires its use not as an additive but as a substantial fraction of the fuel.

When the O/C<1.2, it is possible to generate substantial concentration of $C_2$ compounds, which have low octane number. In this case, the reformate composition may include a ethylene concentration that can be as high as a few percent. The concentration of hydrogen and CO is on the order of 20 mol %, but since the heating value per mol of ethylene is about 4 times that of hydrogen or CO, the contribution to the energy content in the reformate due to $C_2$'s is substantial. Under ideal circumstances, the process can be written as:

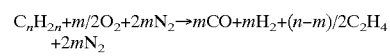

In practice, the process is somewhat less efficient, but for the process of illustration the above is adequate.

It has been suggested to use EGR to the control of the rate of heat release in the engine, needed to avoid knock, by the establishment of substantial temperature gradients in the cylinder. (See, for example, *A numerical study to control combustion duration of hydrogen fueled HCCI by using multi-zone chemical kinetics simulations*, Noda T and Foster, D., SAE 2001-01-0250, the teachings of which are incorporated herein by reference.) However, it has not been previously recognized that reformate gas may be used to control the rate of heat release through established temperature non-uniformities. Nor has there been any mention of using the thermal content of the reformate, as the partial oxidation reforming process is an exothermic reaction, for thermal management of the air/fuel charge into the cylinder.

There is therefore a need for a engine operating in a HCCI mode where reformate gas produced by an onboard fuel reformer from fuel, air, exhaust and other reagents is stored onboard and used for control of engine operation.

SUMMARY OF THE INVENTION

A method and apparatus is disclosed for operation of an internal combustion engine running under a homogeneous charge compression ignition (HCCI) mode with fuel partially reformed by an onboard fuel reformer. In one embodiment, the onboard fuel reformer is a plasmatron fuel converter. The temperature and composition of the gaseous charge into the cylinders of the engine can be adjusted by mixing the charge into the cylinder (which contains air, exhaust gas and/or unreformed fuel) with hydrogen rich gas from the onboard reformer. The fuel reformer transforms the fuel to a mixture of hydrogen, CO and other light hydrocarbons. By adjusting operation in the reformer, the composition of the reformate can be altered. In addition to thermal management of the cylinder charge, the reformate can be used as a fuel blending agent in order to adjust the octane/cetane number of the air charge and thus control the ignition timing of the overall fuel/air charge to the cylinder.

According to one aspect, the present invention is a method for providing engine operating control. The method includes reforming at least a fraction of fuel injected into an onboard fuel reformer. The reformate is injected from the onboard fuel reformer and into a charge intake of an engine cylinder. Compression ignition properties of the charge intake can be controlled by adjusting composition of the reformate and/or controlling a temperature of the charge intake based on exothermicity of reactions in the onboard fuel reformer.

According to another aspect, the present invention is a system for providing engine operating control. The system includes an onboard fuel reformer that reforms at least a fraction of fuel injected therein from a fuel source. An engine having at least one engine cylinder is adapted to receive reformate from the onboard fuel reformer as a charge intake to the engine cylinder. A control mechanism is connected to the onboard fuel reformer and which controls compression ignition properties of the charge intake.

BRIEF DESCRIPTION OF THE DRAWINGS

The invention is described with reference to the several figures of the drawing, in which.

DETAILED DESCRIPTION OF VARIOUS EMBODIMENTS

Figure 1:
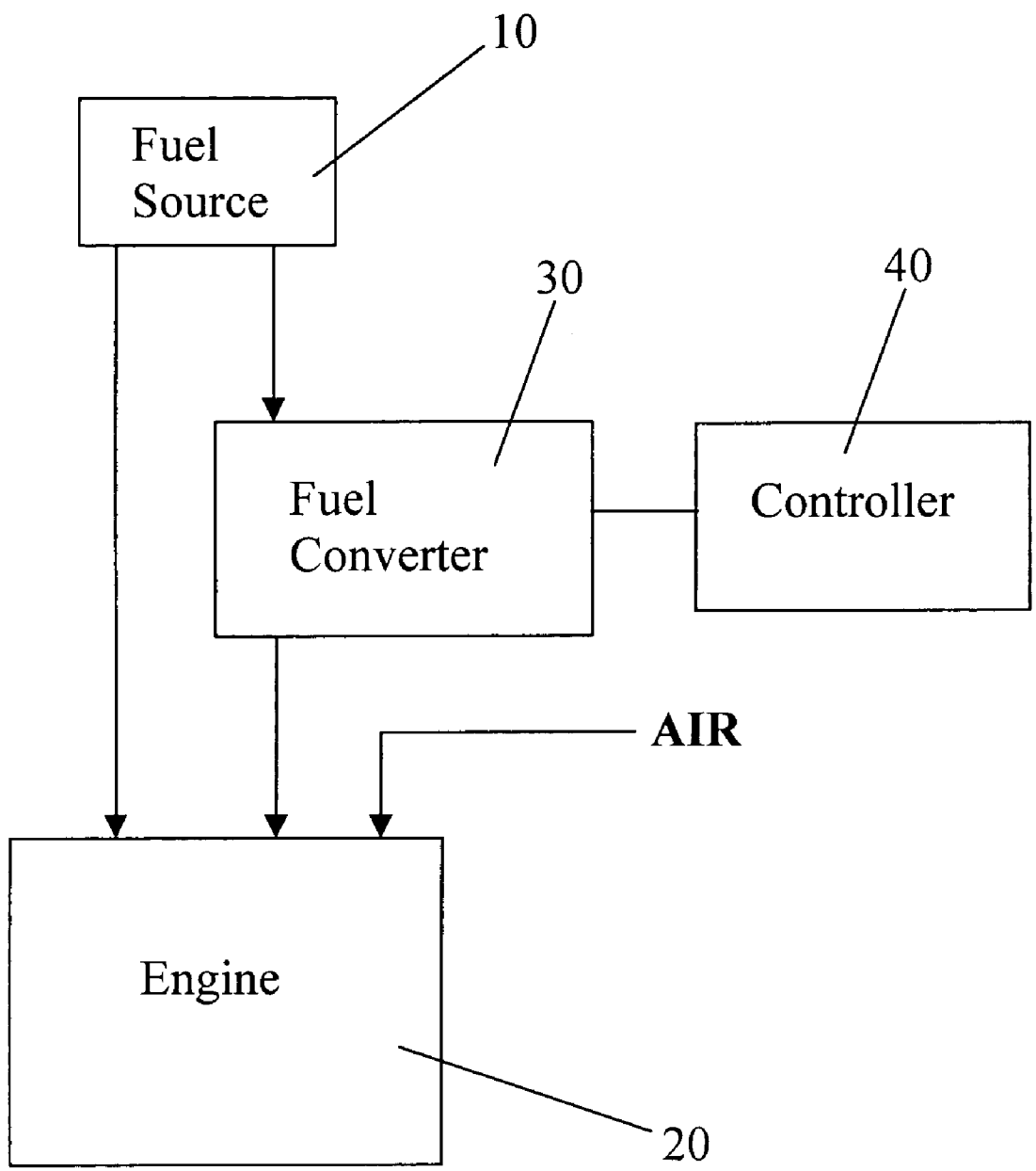
FIG. 1 is a schematic illustration of a fuel converter/engine system for HCCI operation.

The present invention provides a method and means for controlling operation of an HCCI engine, addresses startup and transients, increases the operating window of the engine, and decreases the noise during operation. Hydrogen rich gas could be an ideal fuel for the cold start phase of an engine that, when warm, operates in HCCI mode. During the cold start the engine could operate as an spark ignition engine, with the low emissions characteristics of engine operating in lean mode, enabled by hydrogen addition.

The present invention may utilize any type of fuel reformer; however, one type of reformer particularly suited for the present invention is a plasmatron fuel converter. Plasmatron fuel converters reform hydrocarbons to generate a hydrogen rich gas through the use of plasma discharges. (See, for example, U.S. Pat. No. 6,322,757 to Cohn et al.; U.S. Pat. No. 5,887,554 to Cohn et al.; U.S. Pat. No. 5,437,250 to Rabinovich et al.; U.S. Pat. No. 5,425,332 to Rabinovich et al; and U.S. Pat. No. 5,409,784 to Bromberg et al., the teachings of all of which are incorporated herein by reference.) The use of plasmatron fuel converters is attractive because of their compact size, robustness, rapid response that includes fast startup, insensitivity to fuel composition (which can be changed to adjust the composition of the reformate), minimal soot formation and low electrical power consumption. Plasmatron fuel converters provide electrical discharges in flowing gases of hydrocarbon fuels and air (and/or other oxidants). The resulting generation of locally high temperatures, reactive species in the flowing gases, and increased mixing accelerates reformation of hydrocarbon fuels into hydrogen rich gas. Plasmatron fuel converters may also be utilized for increasing global enthalpy, further accelerating the reaction rates. These conditions facilitate the reforming of a wide range of hydrocarbon fuels into hydrogen-rich gas.

The reformate manufactured by plasmatron fuel converters that utilize a fuel source onboard a vehicle can be used to aid operation of an engine that operates in the HCCI mode. The characteristic of the plasmatron fuel converters in modifying the fuel in a near instantaneous manner can be used to address some of the concerns from engines operating in HCCI mode.

Several types of reactors downstream from the plasmatron head have been used with either no catalyst (homogeneous reforming) or a catalyst (heterogeneous reforming). The effect of the presence of water has also been studied. The purpose of the water addition is to convert, via a water-shift reaction, a large fraction of the CO generated in the plasmatron fuel converter into additional hydrogen, for those applications were hydrogen is much more preferred than CO. High hydrogen yields higher than 100% (hydrogen in product gas divided by hydrogen in fuel) can be achieved with the use of a catalyst and water shifting. Power conversion efficiencies of close to 90% have also been obtained under certain conditions. However, it is difficult to obtain water onboard vehicles, and this will be a major deterrent to the use of the water shift reaction for onboard applications for internal combustion engines.

The combination of partial oxidation reactions with pyrolysis reactions may also produce a product gas with a high heating value. By changing the O/C ratio in the fuel reformer, it is possible to generate a reformate with varying composition. As mentioned above, it possible to use the change in composition of the reformate for controlling the HCCI process.

Generally, the maximum concentration of $H_2$ is produced at an O/C ratio that is in the neighborhood of 1–1.2. Typical operation of the plasmatron fuel converter, with and without a catalyst (heterogeneous operation), is shown in the table below:

|  | Homogeneous | Catalytic |
| --- | --- | --- |
| Concentration |  |  |
| H2 | 0.08 | 0.18 |
| CO | 0.15 | 0.22 |
| C2's | 0.03 | 0.006 |
| Conversion |  |  |
| H2 in fuel to H2 in reformate | 50% | 80% |
| C in fuel to C2's | 25% | 5% |
| Power conversion | 0.75 | 0.7 |
| Reformate Temperature (K) | 1000 | 850 |

In the case of catalytic oxidative diesel conversion by air, ethylene formation can occur if the O/C ratio drops below 1.2, although the $C_2$ yield (carbon conversion to C2's) are (with conventional catalysts) lower in the case of catalytic reactor than in the homogeneous reactor.

The reaction-products heating value increases with decreasing O/C ratio. The maximum value of heating efficiency is around 85% even though there is considerable $C_2H_4$ formation at an O/C ratio of 0.92. At the lower O/C ratios higher heating value efficiency are achieved but there may be a serious problem with soot particulate formation. Previously, diesel fuel has been successfully reformed at O/C~1 using a compact plasmatron reformer that employs a DC arc plasmas. However, arc plasmatron reforming utilizes substantially higher electrical powers and currents.

The characteristics of the fuel reformation process for HCCI applications are discussed next. Two of the features of the reformate features that are useful for control in HCCI combustion are:

(1) The exothermicity of the partial oxidation reaction can be used for heating the incoming air with fast response (since the heat is deposited directly in the gas, avoiding heat transfer through metallic or ceramic walls in the heat exchanger, with a resulting time delay, or without the need of changing EGR); and (2) The octane/cetane value of the fuel can be modified by fuel blending the main fuel with the reformate, either use of hydrogen and CO as a fuel additive, or by the production of $C_2$ compounds, mainly ethylene and ethane, when operating the thermal plasmatron fuel converter at low O/C ratios. Two methods of HCCI control via fuel blending can be used include: variation of O/C in the reformer for modifying the reformate composition; and changing the fraction of the fuel that goes through the reformer Referring now to the figures of the drawing, the figures constitute a part of this specification and illustrate exemplary embodiments of the invention. It is to be understood that in some instances various aspects of the invention may be shown exaggerated or enlarged to facilitate an understanding of the invention.

FIG. 1 illustrates a fuel converter/engine system for operation in HCCI mode. Fuel is injected from a fuel source 10 directly into an engine 20 and is injected into a fuel reformer or converter 30. The thermal content of the reformate is transferred to the charge of a cylinder of the engine 20. Therefore, in this manner, both the fuel blending approach and thermal management approaches for control of the HCCI operation are used. A control mechanism 40 may be utilized to evaluate and control the temperature of the reformate injected into the charge of the cylinder and to evaluate and adjust the composition of the reformate in order to control the compression ignition properties of the charge.

Figure 2:
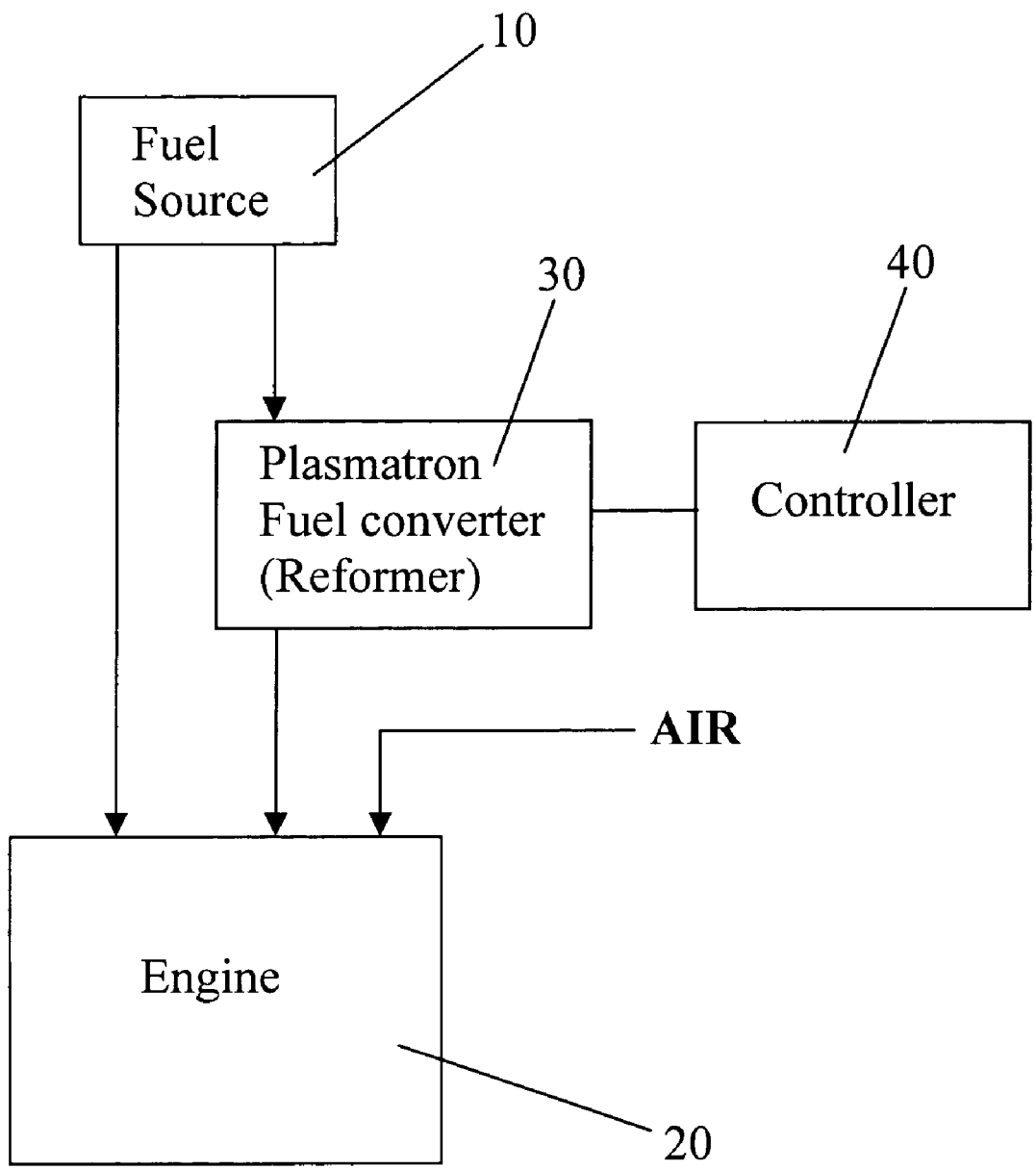
FIG. 2 is a schematic illustration of a fuel converter/engine system for HCCI operation utilizing a plasmatron fuel converter.

The control mechanism 40 is connected to the fuel converter 30 and may be a separate unit from the fuel converter or may be integrated into the design of the fuel converter. In one embodiment, the control mechanism 40 is a computer having engine sensors that evaluate engine operation and supply feedback information to the computer. FIG. 2 is similar to FIG. 1, but with a plasmatron fuel converter as the reformer 30.

Figure 3:
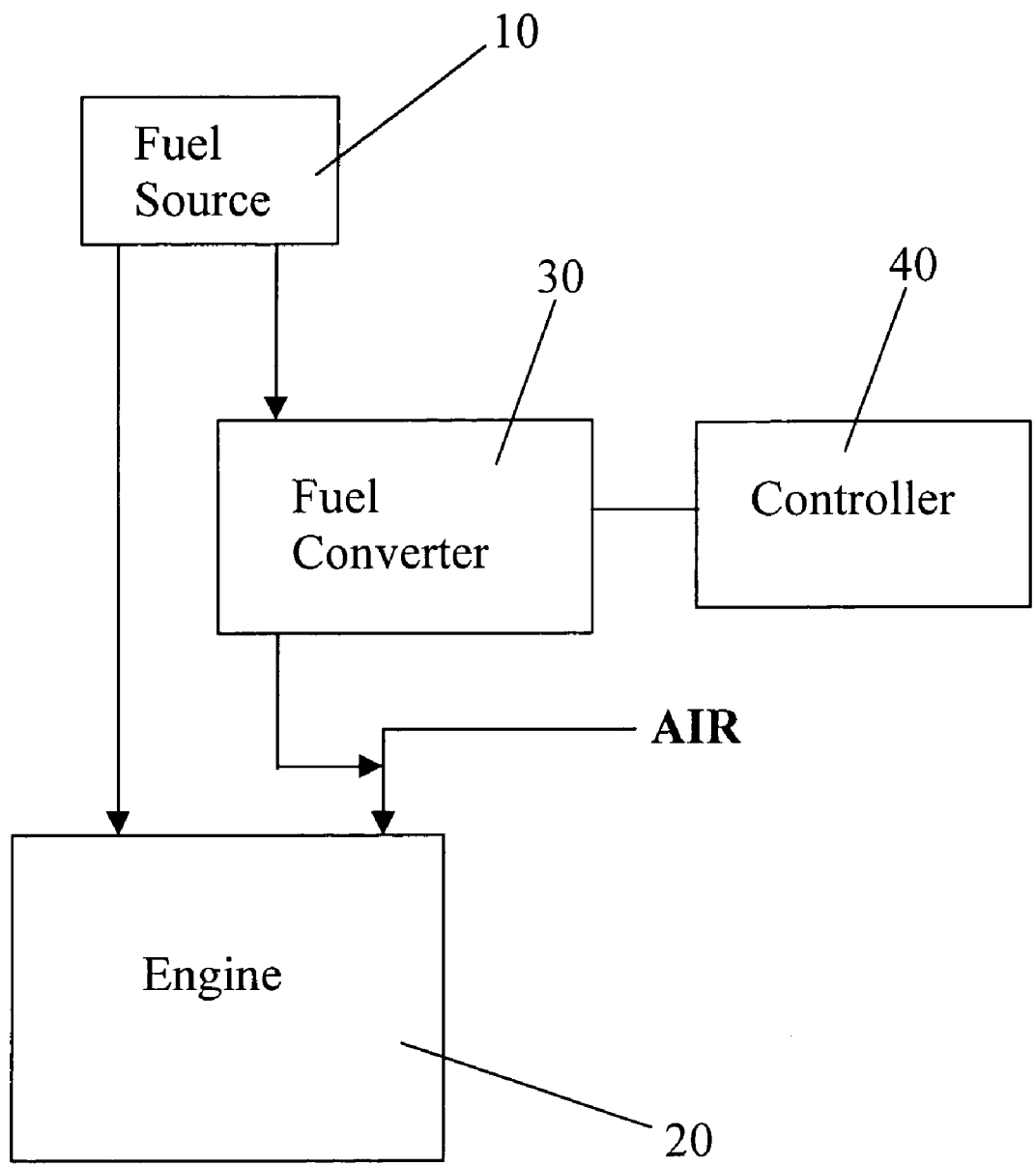
FIGS. 3 and 4 show alternatives to FIGS. 1 and 2 in which the reformate is premixed with air prior to introduction into the cylinder.
Figure 4:
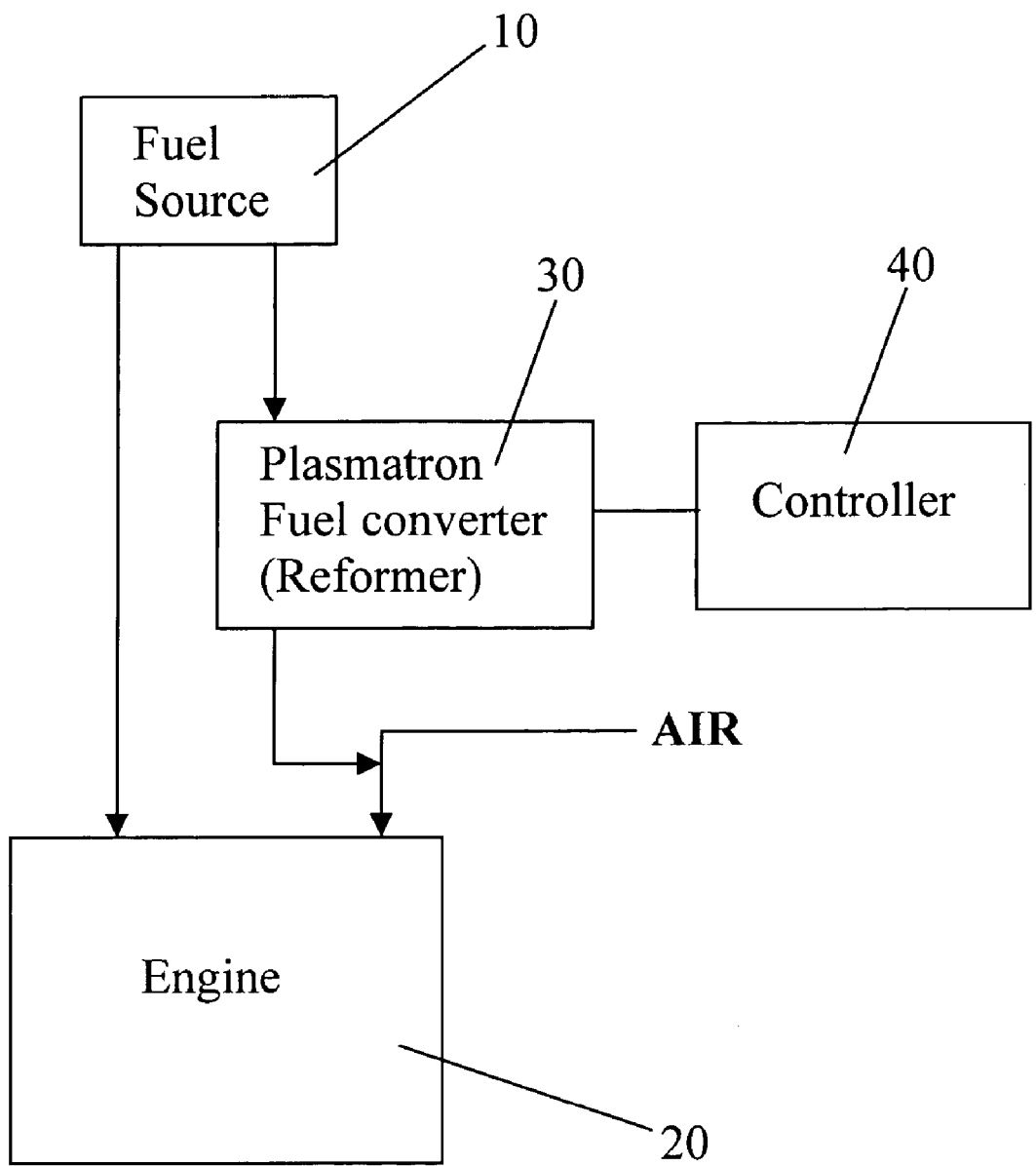

FIGS. 3 and 4 show alternatives where the reformate is premixed with the air prior to introduction into the cylinder. The unreformed fuel is shown in FIGS. 1–4 as being injected directly into the engine, although it is also contemplated that this fuel may be premixed with the air (prior to introduction into the engine cylinder).

Figure 5:
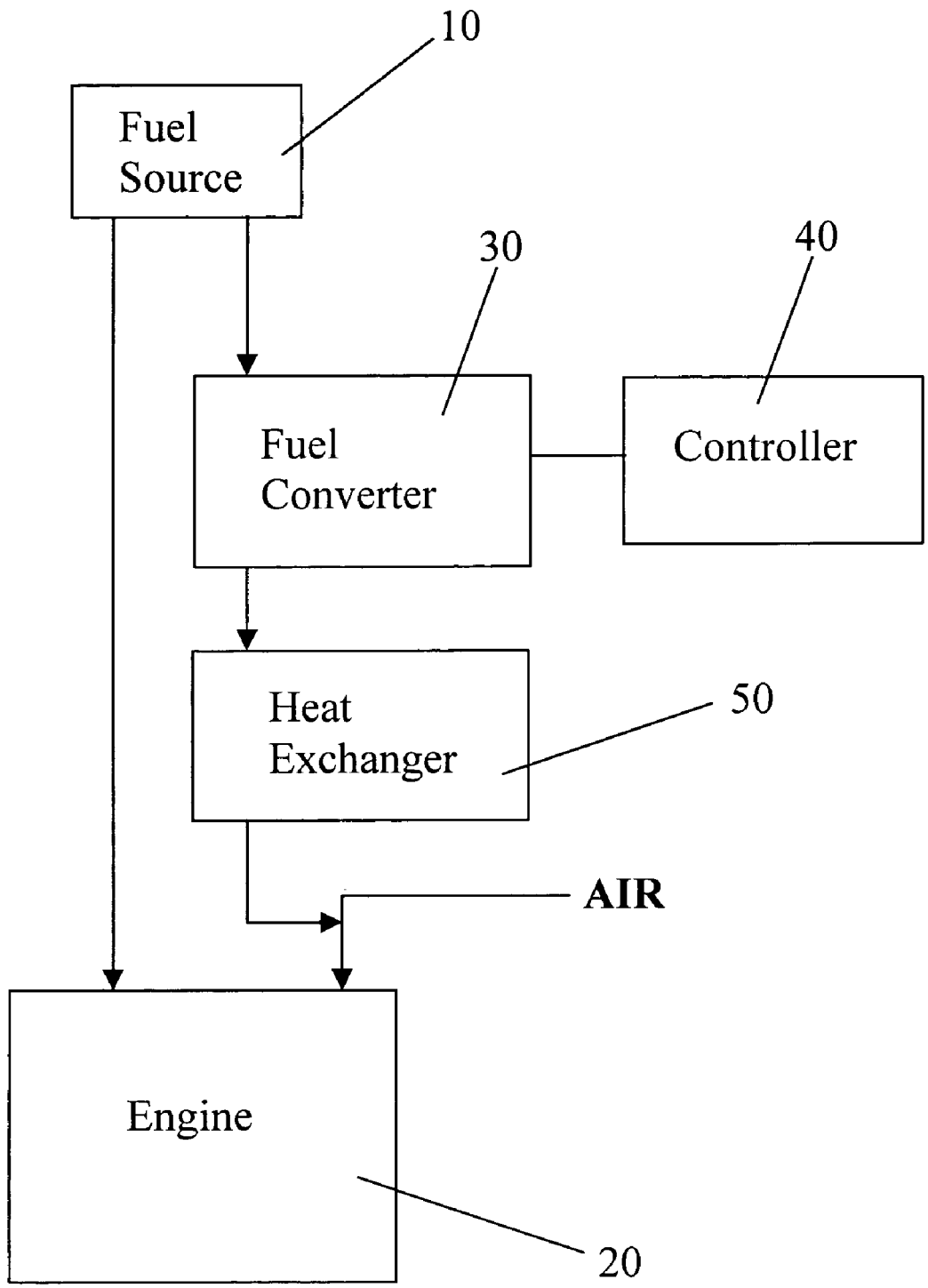
FIG. 5 shows a variation where the reformate is passed through a heat exchanger.

FIG. 5 shows a variation where the reformate is passed through a heat exchanger 50 for thermal management of the reformate. In this case, it is possible to generate reformate for performing fuel blending, with minimal changes of the thermal content of the air/fuel charge into the cylinder.

The fuel reformer in FIGS. 1–5 may operate with air or exhaust gas as the source of the oxidizer.

Figure 6:
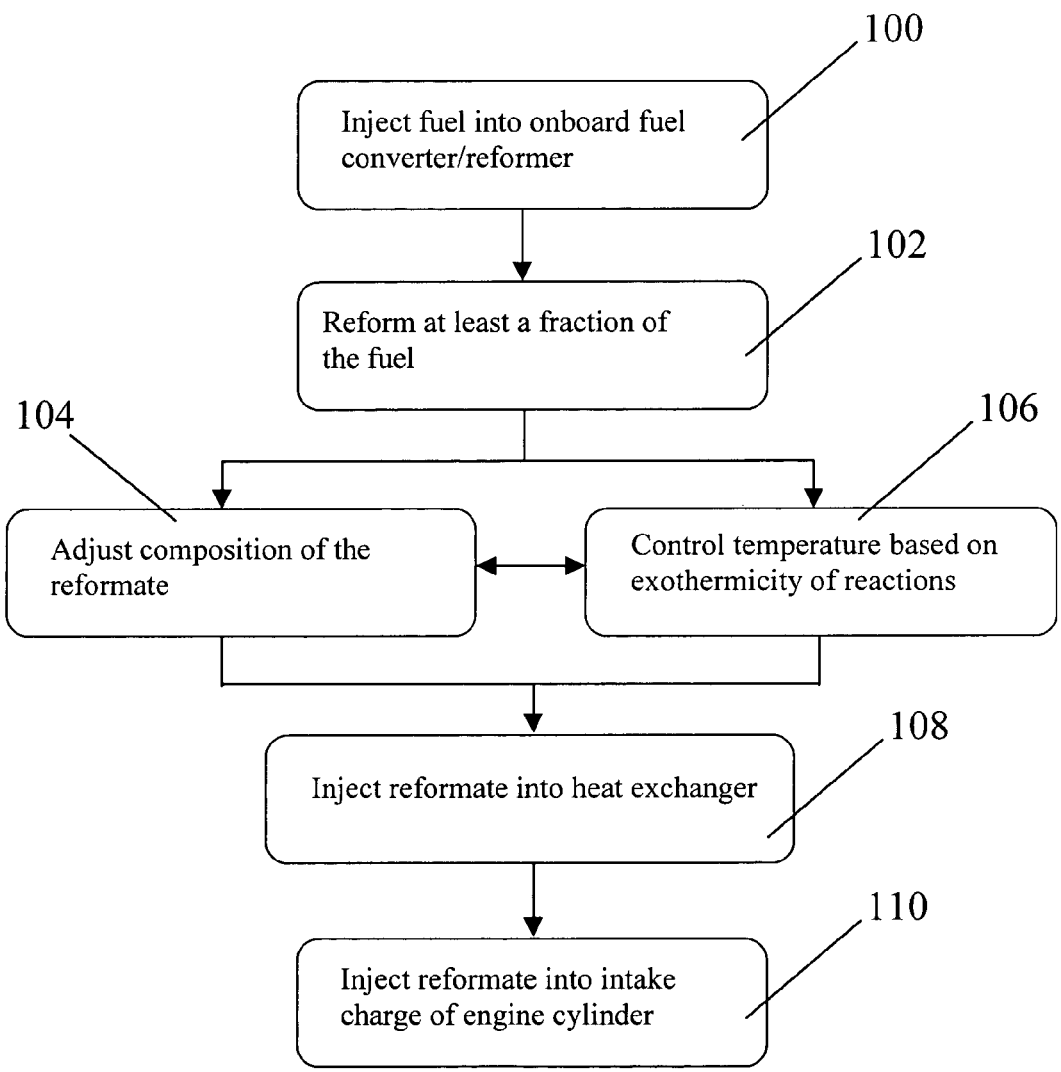
FIG. 6 is a flow diagram of a method according to various embodiments of the invention.

FIG. 6 is a flow diagram showing a method for providing engine operating control in an HCCI mode according to various embodiments of the invention. In step 100, fuel is injected into an onboard fuel reformer/converter from a fuel source. In step 102, at least a fraction of the fuel is reformed by the onboard fuel reformer. The onboard fuel reformer system may include a catalyst positioned downstream. Compression ignition properties of the charge intake are controlled by one or more of adjusting composition of the reformate 104 and controlling a temperature of said charge intake based on exothermicity of reactions in the onboard fuel reformer 106. In step 108, the reformate may be injected into a heat exchanger to manage thermal content of the reformate. In step 110, the reformate is injected into a charge intake of at least one engine cylinder.

As described above, the partial oxidation reforming is exothermic, releasing a small fraction of the heating value of the fuel (around 15%). This heat can be used for controlling the temperature of the gaseous charge that is injected in the engine. The initial temperature of the air/fuel charge to the cylinder is one of a small number of controls that can be used for controlling the ignition timing in HCCI.

During the engine cold start, when the conventional methods of establishing the charge temperature do not work (i.e., EGR or a heat exchanger driven by the exhaust gas), the plasmatron fuel converter can be used to instantaneously increase the charge temperature to the levels required. When the conventional methods are used to increase the temperature of the gas in the cylinder, very low levels of fuel reformation could be used to select rather precisely the charge temperature. When the fuel reformation is performed by the use of a plasmatron fuel converter, a system can have very fast response.

To increase the charge temperature to the temperatures that are desirable, above 100° C., the maximum required fuel to be processed by the fuel converter for startup is on the order of 20%. When operation during startup at torques of less than 20% of maximum load, the charge temperature would be lower than required for HCCI operation (i.e., the engine is operating exclusively on reformate). To operate the engine at lower powers, it would be required to operate the plasmatron in a mode with higher O/C ratios, therefore combusting a fraction of the fuel. Operating the plasmatron in this mode has the advantages of both decreasing the heating value of the reformate fuel (therefore decreasing the engine load) and increasing the enthalpy of the reformate, thus increasing the temperature of the air/reformate fuel mixture.

On the other hand, during warm phase operation, relatively small values of fuel need to be processed into reformate to control the temperature. Assuming that a temperature regulation of 5 K of the charge intake is sufficient for control, about 2% of the fuel needs to be processed by the fuel converter.

The composition of the reformate can be used to control the ignition timing. In order to have concentrations of C2's in the cylinder of about 0.2–0.5%, it is necessary to process less than about 20% of the fuel through the onboard reformer. There is additional unreformed fuel injected into the engine, since the reformate is mainly an additive. The fuel octane/cetane rating can therefore be changed via the addition of reformate from a plasmatron fuel converter. The higher the ethylene concentration in the cylinder, the lower the octane number.

The rate of heat release in the engine, needed to avoid knock and undesirable noise, can be controlled by the establishment of substantial temperature gradients in the cylinder. The use of the reformate can generate temperature and/or composition gradients by not-ideal premixing of the air and the plasmatron reformate. By establishing non-uniform distribution of the reformate in the cylinder it is possible to generate conditions that enhance ignition and control rate of heat release, knock and noise. Since the initial temperature of the reformate is substantially higher than that of EGR, either higher temperature gradients with the same flow of gas, or equal temperature for smaller flow rates of reformate than EGR, can be established.

Although hydrogen has a very high temperature for self-ignition, the presence of hydrogen in the combustion chamber may also help ignition, due to the very small energy required for ignition. Under appropriate set of conditions, the local ethylene ignites the local hydrogen that in turn ignites the local fuel, without the need of flame propagation.

It should be evident to the one of ordinary skill in the art that when controlling the ignition with the onboard fuel processor, the flow can be increased but can only be decreased to complete shutdown. For appropriate operation of the engine, the best embodiments of the control technology would be to operate with a bias flow, so that the control can operate by either increasing or decreasing the flow through the reformer. The required level of the bias is dependent upon the sensitivity of the process to the control through reformate variation, and to the sensitivity of the onboard sensors that monitor the operation of the engine, such as knock sensors, pressure transducers, noise, and others.

Although the combustion process is referred to as HCCI, any near-homogenous combustion process that does not rely on flame propagation but that depends on the nature and conditions (temperature, pressure) of the air/fuel mixture can be controlled in this manner.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for providing engine operating control, comprising:
    reforming at least a fraction of fuel injected into an onboard fuel reformer;
    injecting reformate from said onboard fuel reformer into a charge intake of an engine cylinder; and
    controlling compression ignition properties of the charge intake by adjusting composition of the reformate and controlling a temperature of said charge intake based on thermal content of the reformate generated from exothermicity of reactions in the onboard fuel reformer.

2. The method of claim 1, further comprising controlling a bias flow that increases or decreases fluid flow through the reformer.

3. The method of claim 1, wherein the charge intake is stratified so that the distribution of the reformate in the engine cylinder is non-uniform.

4. The method of claim 1, further comprising non-uniformly distributing the reformate to establish a temperature gradient in the engine cylinder.

5. The method of claim 1, wherein the onboard fuel reformer is a fast starting reformer that allows for adequate engine operation during start up when the engine is run as a spark ignition engine and allows for adequate engine operation in the presence of transients.

6. The method of claim 1, wherein the onboard fuel reformer is a plasmatron fuel converter.

7. The method of claim 1, wherein said onboard fuel reformer includes a catalyst.

8. The method of claim 1, where the reformate is premixed with air before being injected into the charge intake of the engine cylinder.

9. The method of claim 1, wherein the reformate is injected directly into the charge intake of the engine cylinder.

10. The method of claim 1, wherein the reformate is passed through a heat exchanger prior to injection into the cylinder or premixing with the air, fuel or air/fuel mixture.

11. The method of claim 1, wherein the reformer is controlled by signals that are controlled by a computer having engine sensors for evaluation of engine operation and that takes into account operator requirements.

12. The method of claim 1, wherein fuel blending is utilized to control said composition.

13. A system for providing engine operating control, comprising:
    an onboard fuel reformer that reforms at least a fraction of fuel injected therein from a fuel source;
    an engine having at least one engine cylinder that receives reformate from said onboard fuel reformer as a charge intake to the engine cylinder; and
    a control mechanism connected to said onboard fuel reformer and which controls compression ignition properties of the charge intake by adjusting composition of the reformate and controlling a temperature of said charge intake based on thermal content of the reformate generated from exothermicity of reactions in the onboard fuel reformer.

14. The system of claim 13, wherein said control mechanism is a computer having engine sensors that evaluate engine operation.

15. The system of claim 14, wherein said computer is adapted to receive as input external operator requirements.

16. The system of claim 13, further comprising a heat exchanger disposed between said fuel reformer and said engine that manages thermal content of said charge intake.

17. The system of claim 13, wherein said control mechanism utilizes fuel blending to control said composition.

18. The system of claim 13, wherein the charge intake is stratified so that the distribution of the reformate in the engine cylinder is non-uniform.

19. The system of claim 13, wherein said control system establishes a temperature gradient in the engine cylinder through non-uniform distribution of the reformate.

20. The system of claim 13, wherein the onboard fuel reformer is a fast starting reformer that allows for adequate engine operation during start up when the engine is run as a spark ignition engine and that allows for adequate engine operation in the presence of transients.

21. The system of claim 13, wherein the onboard fuel reformer is a plasmatron fuel converter.

22. The system of claim 13, wherein said onboard fuel reformer includes a catalyst.

23. The system of claim 13, where the reformate is premixed with air before being injected into the charge intake of the engine cylinder.

24. The system of claim 13, wherein the reformate is injected directly into the charge intake of the engine cylinder.

25. The system of claim 13, wherein said control mechanism further controls a bias flow that increases or decreases fluid flow through the reformer.

26. The method of claim 1, further comprising non-uniformly distributing the reformate to establish a temperature gradient in the engine cylinder and to control the rate of heat release.

27. The system of claim 13, wherein said control system establishes a temperature gradient in the engine cylinder through non-uniform distribution of the reformate in order to control the rate of heat release.

* * * * *